Nov. 9, 1971  W. E. HULL  3,618,400
GRADE AND ACCELERATION-DECELERATION INDICATING DEVICE
Filed May 5, 1969  2 Sheets-Sheet 1
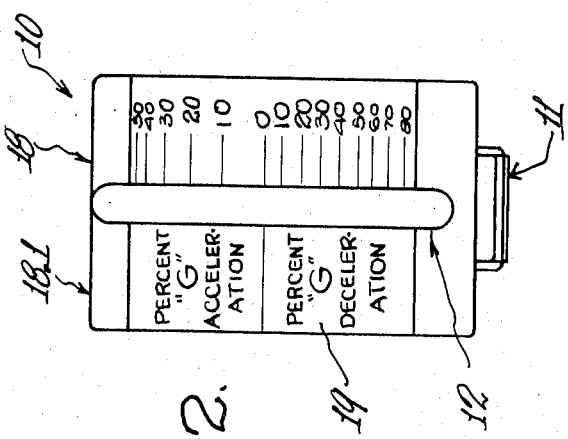
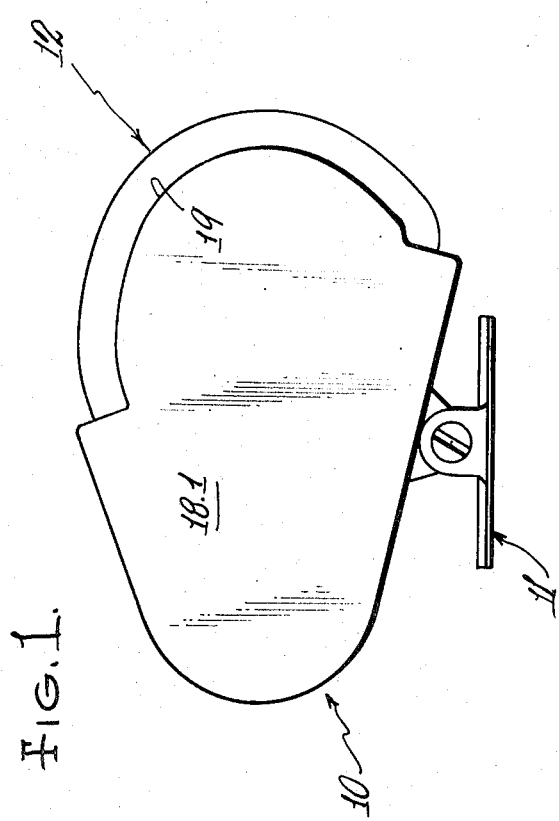
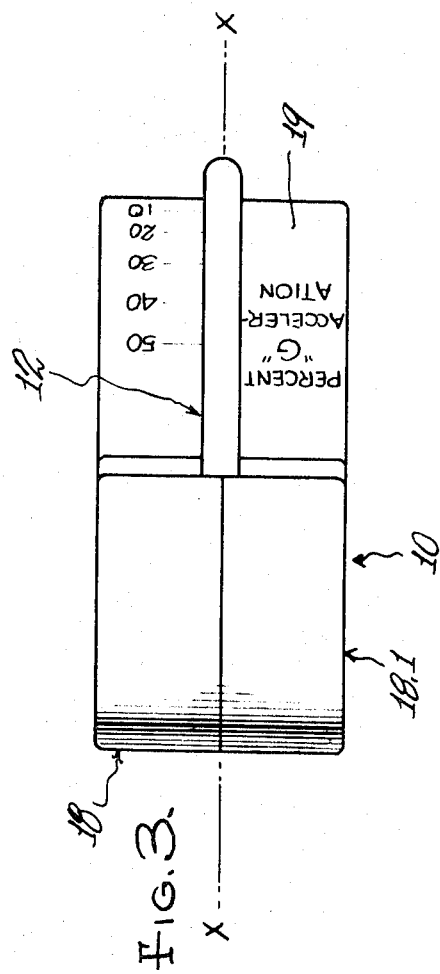
INVENTOR.
WALTER E. HULL
BY
*Williams and Kresh*
ATTORNEYS Nov. 9, 1971  W. E. HULL  3,618,400
GRADE AND ACCELERATION-DECELERATION INDICATING DEVICE
Filed May 5, 1969  2 Sheets-Sheet 2
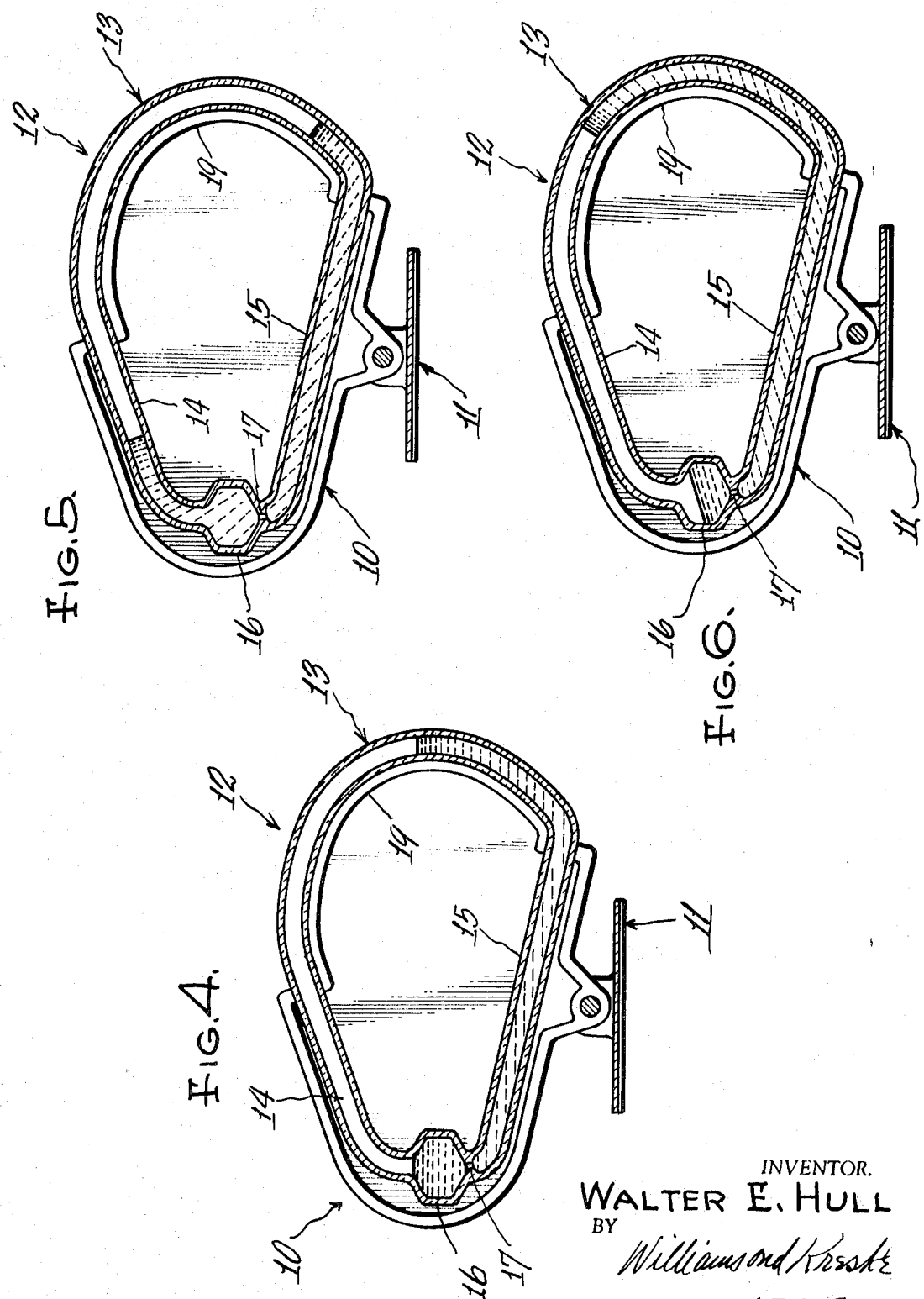
INVENTOR.
WALTER E. HULL
BY
*Williams and Krsske*
ATTORNEYS

United States Patent Office 3,618,400
Patented Nov. 9, 1971

3,618,400
GRADE AND ACCELERATION-DECELERATION INDICATING DEVICE
Walter E. Hull, R.D. 4, Box 67, Cortland, Ohio 44410
Filed May 5, 1969, Ser. No. 821,768
Int. Cl. G01p *15/00*
U.S. Cl. 73—515
11 Claims

ABSTRACT OF THE DISCLOSURE

A device adapted to be mounted on a vehicle for indicating the grade of terrain being traversed and for indicating the instantaneous rate of acceleration and deceleration of such vehicle. The device comprises an elongated conduit containing a liquid whose level within the conduit is responsive to gravity and to the inertial forces of acceleration and deceleration. Such inertial forces raise and lower the level of the liquid relative to a reference point, depending upon the direction of force application, an amount proportional to such forces.

In series with the liquid-containing conduit is a radially enlarged chamber adapted to be completely filled with the indicating liquid, but short of overflowing, when the vehicle is at rest on a level surface at which time the liquid level coincides with the reference point. The chamber aforesaid, as a result of its relatively large cross-sectional size, functions to increase the change of level of the indicating liquid under the application of an inertial force in one direction over the change of liquid level under the application of an equal but oppositely applied inertial force.

BACKGROUND AND SUMMARY

Grade indicating and acceleration-deceleration indicating devices have heretofore been known, however, most have been complex, costly and unreliable. Moreover, none of the prior art devices have, so far as known, taken into consideration the fact that most vehicles are capable of decelerating at a far greater rate than they are capable of accelerating. For example, few modern automobiles are capable of accelerating over an appreciable length of time at a rate greater than ⅓ of the acceleration rate imparted by gravity; i.e., one third G. On the other hand, most modern automobiles can easily exceed two thirds G in deceleration. Indeed, braking ability is not generally considered good unless greater than three quarters G deceleration rates can be achieved in a stop from a speed of at least 60 miles per hour.

In prior art devices, the movement of whatever indicator was used and therefore the scale graduations were the same for acceleration and deceleration; accordingly, maximum potential indicator movement under deceleration was more than twice that of maximum potential indicator movement under acceleration. Since, for practical reasons, the total amount of indicator movement is always rather limited, the relatively small indicator movement under acceleration made it difficult to determine the rate of acceleration with sufficient accuracy for practical use.

In contrast, the present invention provides a device in which indicator movement under a given rate of acceleration is approximately double that of indicator movement under deceleration at the same rate. Accordingly, with indicator movement amplified during acceleration, readings of the rate of acceleration become far more accurate and meaningful. These and other advantages of the present invention will readily become apparent from a study of the following description and from the appended drawings.

DRAWING DESCRIPTION

In the drawings accompanying this specification and forming a part of this application there is shown, for purpose of illustration, an embodiment which the invention may assume, and in these drawings:

FIG 1 is a side elevational view of a device embodying the present invention,

FIG. 2 is a front elevational view of the device seen in FIG. 1,

FIG. 3 is a top plan view of the device,

FIG. 4 is a view similar to FIG. 1 but with the housing near side removed to show the interior construction, and FIGS. 5 and 6 are views similar to FIG. 4 but respectively showing the device subjected to a 60% of gravity deceleration force and a 30% of gravity acceleration force.

DETAILED DESCRIPTION

With reference to FIGS. 1 through 4, the device comprises a housing 10 pivoted to a mounting foot 11 by means of which the device may be secured to the upper surface of the dash of a motor vehicle, forwardly of and in easy view of the driver, with the longitudinal axis X—X of the device (FIG. 3) parallel with the longitudinal axis of the vehicle and with the left end of the device (in the position of parts seen in FIG. 1) toward the front of the vehicle.

Supported by the latter to be described housing 10 and partially enclosed thereby is a transparent conduit 12 formed of glass or a suitable plastic such as acrylic. Conduit 12 has an arcuate portion 13 disposed outside the housing 10 and, within the housing, rectilinear converging upper and lower portions 14 and 15 joined by a connecting portion 16. In the present embodiment and for a purpose to appear, conduit connecting portion 16 is radially enlarged to provide a chamber whose internal diameter is approximately four times that of the internal diameter of the arcuate conduit portion 13. The internal diameters of the conduit portions 14 and 15 will conveniently be the same as that of the arcuate conduit portion 13.

Conduit 12 contains a suitable liquid which will not freeze under normal use conditions. Such liquid may be alcohol or light oil and will preferably be colored for maximum visibility. The quantity of liquid will be such that with the device at rest in the position shown in FIG. 4, the chamber provided by the conduit enlargement 16 will be completely filled, without overflowing into the conduit portion 14, while the liquid level in arcuate conduit portion 13 will be at reference point 0. For a purpose to appear, communication between chamber 16 and conduit portion 15 will be through a small orifice 17.

Returning now to the housing 10, the latter, is preferably formed of identical, but opposite hand pieces 18, 18.1 abutted at the previously mentioned longitudinal axis X—X. Housing 10 encloses all but the arcuate conduit portion 13 and such housing has an arcuate wall 19 complementary to and underlying such conduit portion. Wall 19 provides an arcuate face displaying a suitable scale and as best seen in FIG. 2, such scale is marked with the reference point 0 and with ascending graduations 10 through 50 and descending graduations 10 through 80. As shown on the scale, the ascending graduations represent the percent G (gravity) of acceleration attained while the decending graduations represent the percent G of deceleration attained.

OPERATION

Assuming the vehicle in which the device is mounted is traveling at a constant speed on a level road, the liquid level in conduit portion 13 will be at 0 to indicate there is neither acceleration nor deceleration while the liquid level in the enlargement 16 will be precisely at the juncture between such enlargement and the conduit portion 14.

If the brakes of the vehicle are now applied to decelerate the latter at a rate of, for example, 60% of G; that is, 60% of gravity, the liquid level in conduit portion 13 will fall while the liquid level in conduit portion will rise and overflow into conduit portion 14 until such levels are balanced, as seen in FIG. 5, in accordance with the resultant force developed between the force of gravity and the assumed rate of deceleration. Since the internal diameter of the conduit portion 13 and that of conduit portion 14 are equal, liquid will rise in the conduit portion 14 and the same amount as it falls in the conduit portion 13. Under the above assumed deceleration conditions, the liquid level in conduit portion 13 will coincide with the lower 60% G scale graduation.

Assuming that the vehicle is again traveling at a constant speed on a level road or is at rest, the liquid once again will be in the position seen in FIG. 4. Further assuming that the vehicle is now accelerated at a rate of, for example, 30% of G, the liquid level in conduit portion 13 will rise while the liquid level in conduit portion 16 will fall until such levels are balanced, as seen in FIG. 6, in accordance with the resultant force developed between the force of gravity and the assumed rate of acceleration. Since the internal diameter of the conduit portion 13 is much less than that of the conduit portion 16, the liquid level in conduit portion 13 will rise much more than the liquid level will fall in conduit portion 16. Under the above-assumed acceleration conditions, the liquid level in conduit portion 13 will coincide with the upper, 30% G scale graduation.

It is to be noted that in accelerating at a rate of 30% G, the liquid rises in conduit portion 13 above the 0 reference approximately the same amount as it falls below the 0 reference under a deceleration rate of 60% G. Accordingly, acceleration rates are indicated with far greater accuracy than in prior art devices in which indicator movement is the same under a given rate of acceleration and deceleration.

As earlier mentioned, a small orifice 17 establishes communication between the conduit portions 15, 16 and the purpose of such orifice is to so restrict liquid flow that rapid changes in fluid level will be avoided. In this way, more accurate readings may be obtained since transient variations in acceleration or deceleration will not be reflected in a change in the liquid level.

While the device has thus far been described as being used to indicate acceleartion and deceleration, it will be understood that when a vehicle on which the device is mounted is stopped on a downgrade or is traveling at a steady speed thereon, the lower scale portion will indicate the percent of grade of the road. Similarly, the upper scale portion will indicate the percent of grade when the vehicle is stopped or is traveling at a steady speed on an upgrade.

I claim:

1. A device adapted to be mounted on a vehicle for indicating the grade of terrain being traversed and for indicating the rate of acceleration and deceleration of such vehicle, such device having a movable indicator which is shifted in one direction from a reference point an amount proportional to the rate of vehicle acceleration in response to inertial forces acting in one direction and which is shifted in the opposite direction from such reference point an amount proportional to vehicle deceleration in response to inertial forces acting in the opposite direction, the improvement comprising:

means for increasing the amount of movement of said indicator in response to inertial forces acting in one of said directions over the amount of movement of said indicator in response to inertial forces acting in the opposite direction.

2. The construction of claim 1 wherein said indicator is a fluid within an elongated conduit.

3. The construction of claim 2 wherein the level of said fluid in a particular portion of said conduit relative to the reference point aforesaid indicates the direction and magnitude of said inertial forces.

4. The construction of claim 2 wherein said conduit provides a pair of generally upright portions whose lower ends are connected for intercommunication whereby fluid displaced from either of said conduit portions will be transferred to the other of said conduit portions, wherein the level of said fluid in one of said conduit portions relative to said reference point indicates the direction and magnitude of said inertial forces, and wherein one of said conduit portions is so arranged that displacement of a given volume of fluid therefrom and into said other conduit portion by an inertial force acting in one direction causes an increase in fluid level in such other conduit portion which is greater than the decrease in fluid level in such one conduit portion.

5. A device adapted to be mounted on a vehicle for indicating the grade of terrain being traversed and for indicating the rate of acceleration and deceleration of such vehicle, such device having a movable indicator in the form of fluid within an elongated conduit, said fluid being shifted in one direction from a reference point an amount proportional to the rate of vehicle acceleration in response to inertial forces acting in one direction and being shifted in the opposite direction from said reference point an amount proportional to vehicle deceleration in response to inertial forces acting in the opposite direction, the improvement comprising means for increasing the amount of movement of said indicator in response to inertial forces acting in one of said directions over the amount of movement of said indicator in response to inertial forces acting in the opposite direction, said means comprising a radially enlarged chamber in communication with said conduit and said chamber being completely filled with fluid when inertial forces are zero, said chamber overflowing as fluid is forced thereinto in one direction of application of inertial forces and said chamber emptying as fluid is drained therefrom in the opposite direction of application of interial forces.

6. The construction of claim 5 wherein said conduit and said chamber form a closed circuit for said fluid.

7. The construction of claim 6 wherein said conduit and said chamber are in series relation.

8. The construction of claim 7 wherein the level of said fluid in a particular portion of said conduit indicates the direction and magnitude of said inertial forces, and wherein said chamber is spaced from said particular conduit portion.

9. The construction of claim 6 wherein said conduit is in the form of a loop for disposition in a vertical plane, wherein the level of said fluid in an intermediate portion of said conduit relative to the reference point aforesaid indicates both the direction and magnitude of said inertial forces, and wherein said chamber is spaced from said conduit intermediate portion and establishes the sole communication between respective ends of said conduit.

10. The construction of claim 9 wherein said conduit intermediate portion is arcuate.

11. The construction of claim 9 wherein said chamber and the conduit portions thereadjacent are enclosed in a housing, and wherein said conduit intermediate portion is exposed for view exteriorly of said housing.

References Cited

UNITED STATES PATENTS

| | | | |
|---|---|---|---|
| 1,605,520 | 11/1926 | Dodge | 73—515 X |
| 1,975,824 | 10/1934 | Blackwood | 73—515 X |
| 2,021,667 | 11/1935 | Miess | 73—515 |
| 2,063,495 | 12/1936 | Elsom | 73—515 |

FOREIGN PATENTS

| | | | |
|---|---|---|---|
| 561,463 | 10/1932 | Germany | 73—515 |

LOUIS J. CAPOZI, Primary Examiner

U.S. Cl. X.R.

116—114 AH